United States Patent
DiTullio et al.

(10) Patent No.: US 10,606,612 B2
(45) Date of Patent: Mar. 31, 2020

(54) CONTEXT CHECK BYPASS TO ENABLE OPENING SHARED-OBJECT LIBRARIES

(71) Applicant: Apptimize LLC, San Francisco, CA (US)

(72) Inventors: Jeff DiTullio, Menlo Park, CA (US); Michael Ryan Fenton, Thunder Bay (CA); James Brandon Koppel, Cambridge, MA (US); Timothy D. Lundeen, San Francisco, CA (US)

(73) Assignee: Apptimize LLC, San Francisco, CA (US)

( * ) Notice: Subject to any disclaimer, the term of this patent is extended or adjusted under 35 U.S.C. 154(b) by 0 days.

(21) Appl. No.: 16/112,305

(22) Filed: Aug. 24, 2018

(65) Prior Publication Data

US 2019/0065218 A1 Feb. 28, 2019

Related U.S. Application Data

(60) Provisional application No. 62/549,533, filed on Aug. 24, 2017.

(51) Int. Cl.
*G06F 9/445* (2018.01)
*G06F 9/448* (2018.01)

(52) U.S. Cl.
CPC ........ *G06F 9/44521* (2013.01); *G06F 9/4484* (2018.02)

(58) Field of Classification Search
CPC . G06F 9/44505; G06F 9/44521–44526; G06F 9/4484; G06F 9/449

USPC .................. 709/331–332, 310; 717/162–167
See application file for complete search history.

(56) References Cited

U.S. PATENT DOCUMENTS

| | | | |
|---|---|---|---|
| 8,091,080 B2* | 1/2012 | Andersen ................ | G06F 8/656 717/164 |
| 2010/0095281 A1* | 4/2010 | Raber .................... | G06F 11/362 717/129 |
| 2019/0065223 A1* | 2/2019 | DiTullio ............... | G06F 9/4552 |

OTHER PUBLICATIONS

Anonymous, "ndk_dlopen: a lightweight ndk utility that helps bypass Android N's classloader-namespace restriction", Github [online] , Jan. 28, 2017 [retrieved Nov. 4, 2019], Retrieved from Internet: <URL: https://github.com/Rprop/ndk_dlopen>, pp. 1-8.*

(Continued)

*Primary Examiner* — Todd Aguilera
(74) *Attorney, Agent, or Firm* — Fenwick & West LLP (57) ABSTRACT

Techniques to bypass system context checks to facilitate opening shared-object libraries are disclosed herein. In at least one implementation, a copy of a header of a shared-object library loaded by a runtime system is created. The header of the shared-object library loaded by the runtime system is patched with code configured to call an open function, wherein the code patched into the header of the shared-object library executes and calls the open function from the shared-object library loaded by the runtime system, the call to the open function is recognized as within a context of the runtime system, and the shared-object library is allowed to be opened. A pointer to the shared-object library opened in memory is received, and the header of the shared-object library is restored to an original version using the copy of the header of the shared-object library.

20 Claims, 7 Drawing Sheets

201. RUNTIME SYSTEM LOADS SHARED-OBJECT LIBRARY

202. PATCH HEADER WITH CODE THAT CALLS DLOPEN ⟶

203. CODE CALLS DLOPEN FROM SYSTEM'S COPY OF THE SHARED-OBJECT LIBRARY

204. DLOPEN ALLOWS THE SHARED-OBJECT LIBRARY TO BE OPENED SINCE THE RETURN ADDRESS OF THE CALL IS WITHIN THE SYSTEM'S CONTEXT, AND RETURNS A POINTER TO THE OPENED LIBRARY

205. RESTORE ORIGINAL HEADER OF THE SHARED-OBJECT LIBRARY ⟶

206. THE OPENED SHARED-OBJECT LIBRARY ALLOWS ACCESS TO MEMORY ADDRESSES OF SYMBOLS (56) References Cited

OTHER PUBLICATIONS

Ivanov, D., et al., "Improving Stability with Private C/C++ Symbol Restrictions in Android N", Android Developers Blog [online], 2016 [retrieved Nov. 5, 2019], Retrieved from Internet: <URL: https://android-developers.googleblog.com/2016/06/improving-stability-with-private-cc.html>, pp. 1-5.*

Wang, Z., "Nannespace Dynamic Linking—Isolating Native Library of Application and System in Android", jackwish.net [online], Jun. 20, 2017 [retrieved Nov. 5, 2019], Retrieved from Internet: <URL: https://jackwish.net/namespace-based-dynamic-linking.html>, pp. 1-12.*

Thomas, R., "Android Runtime Restrictions Bypass", Quarkslab's Blog [online], 2019 [retrieved Nov. 5, 2019], Retrieved From Internet: <URL: https://blog.quarkslab.com/android-runtime-restrictions-bypass.html>, pp. 1-7.*

* cited by examiner

101. RUNTIME SYSTEM LOADS SHARED-OBJECT LIBRARY:

102. APPLICATION CODE CALLS DLOPEN ON THE SHARED OBJECT LIBRARY LOADED BY THE RUNTIME SYSTEM

103. DLOPEN PREVENTS THE SYSTEM COPY OF THE SHARED-OBJECT LIBRARY TO BE OPENED SINCE THE RETURN ADDRESS OF THE CALL FROM THE APPLICATION CODE IS NOT WITHIN THE SYSTEM'S CONTEXT, AND INSTEAD LOADS A NEW COPY OF THE LIBRARY:

104. CALLER HAS NO ACCESS TO THE MEMORY ADDRESSES OF SYMBOLS IN THE SYSTEM COPY OF THE SHARED-OBJECT LIBRARY

CONTEXT CHECK BYPASS TO ENABLE OPENING SHARED-OBJECT LIBRARIES

RELATED APPLICATIONS

This application claims the benefit of, and priority to, U.S. Provisional Patent Application No. 62/549,533, entitled "CONTEXT CHECK BYPASS TO ENABLE OPENING SHARED-OBJECT LIBRARIES" filed Aug. 24, 2017, which is hereby incorporated by reference in its entirety for all purposes.

TECHNICAL BACKGROUND

Modern computing systems such as smartphones, tablets, and other mobile devices enable users to install and run various applications. These mobile applications typically provide a wide range of functionality, such as streaming video, social networking, games, email, instant messaging, weather, navigation, or any other mobile application. An application may be referred to as "native" to a particular computing system when the application program code is executable by a processor of the computing system without requiring translation.

In various runtime environments, it is possible to modify how a method, function, class, or other such software component maps to the actual code implementation of the component. Sometimes referred to as swizzling, such re-mapping technology allows code associated with one function to be replaced by code associated with another function. This may be useful in the context of making modifications to a user interface of an application, for example. Some implementations of re-mapping technology involve modifying the value of a pointer that points to a location in memory where a method is implemented in code. By changing the value of the pointer, the method can be made to point to other code such that, when the method is called, a different method is employed in its place. The target method that is called in place of the original method is sometimes referred to as a callback function. Such techniques may enable a software development kit (SDK) to make modifications to an application without altering the main program code of the application.

Certain runtime environments provide shared-object libraries used by applications, which may be utilized to perform various functions and features. In some instances, an SDK configured to make real-time modifications to an application might require access to the memory addresses of symbols in the shared-object library in order to modify or block certain features that would otherwise complicate or prevent the SDK from making these modifications. However, some operating systems could prevent an application from opening a shared-object library, thereby blocking the application from accessing the memory locations of the symbols in the library.

OVERVIEW

Provided herein are techniques to bypass system context checks to facilitate opening shared-object libraries. In at least one implementation, a copy of a header of a shared-object library loaded by a runtime system is created. The header of the shared-object library loaded by the runtime system is patched with code configured to call an open function, wherein the code patched into the header of the shared-object library executes and calls the open function from the shared-object library loaded by the runtime system, the call to the open function is recognized as within a context of the runtime system, and the shared-object library is allowed to be opened. A pointer to the shared-object library opened in memory is received, and the header of the shared-object library is restored to an original version using the copy of the header of the shared-object library.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Mobile application designers often desire to make changes and updates to visual elements and other aspects of the user interface of an application. Ordinarily, such changes would require the application developers to edit program code to implement the new application design requirements. However, a framework can be installed into a mobile application which can receive and interpret changes to visual properties of display elements, providing a quick and easy way for designers to edit the user interface of a mobile application without having to write any programming code. Such changes and new features can then be tested on subsets of the user base using various techniques such as A/B testing, staged rollouts, and feature toggling. In order to achieve some of this functionality, the framework may need to open a shared-object library to gain access to the memory addresses of symbols in the library. For example, the framework may utilize a software development kit (SDK) to call dlopen on a shared-object library, such as libart.so in the Android® Runtime (ART) environment. However, version 7 of the Android® operating system added context checking for dlopen calls, and no longer allows an application to call dlopen on libart.so or other shared-object libraries that were already loaded by the runtime system. Specifically, the check added to dlopen in Android® 7 looks at the caller's return address, and allows libraries to be opened if they are part of the caller's context, or if they are a new, previously unloaded library. For libraries that have already been loaded by another context, such as the runtime system, a new copy of the library is loaded in the caller's namespace, so there is no access by the caller to the memory addresses of symbols in any library that was previously loaded in another context. The following disclosure provides various techniques for bypassing such system context checks to enable opening shared-object libraries.

Systems, methods, and software are disclosed herein that enhance application development and software design-for-test (DFT) technology utilizing an application development and optimization platform to facilitate bypassing system context checks to enable opening shared-object libraries. Among other benefits, the techniques described herein provide an application developer the ability to open system-context libraries to which access is required in order to modify or block certain features that would otherwise complicate or prevent the developer from making modifications to a mobile application.

Figure 1:
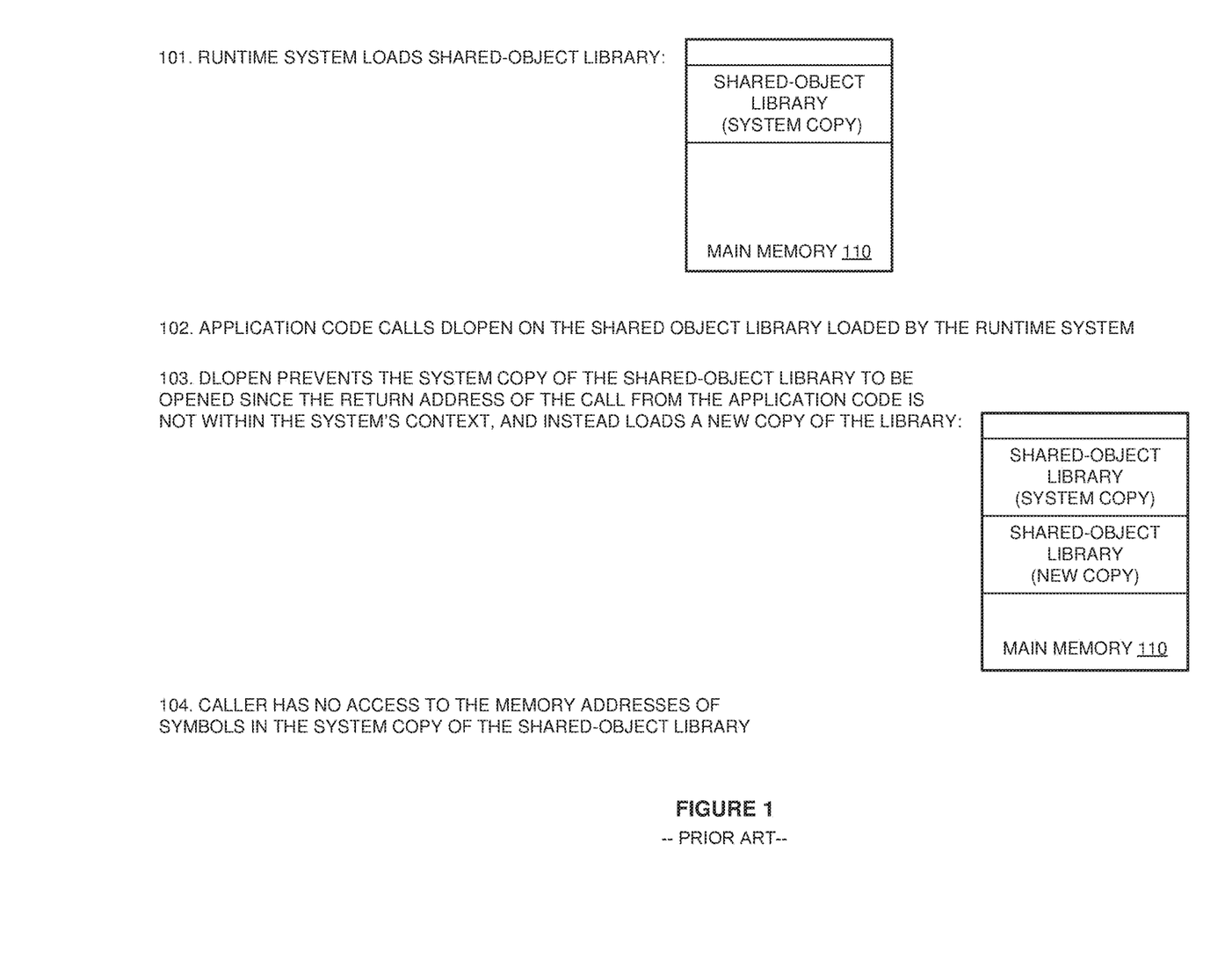
FIG. 1 is a block diagram that illustrates a process flow of a problem statement.
Figure 2:
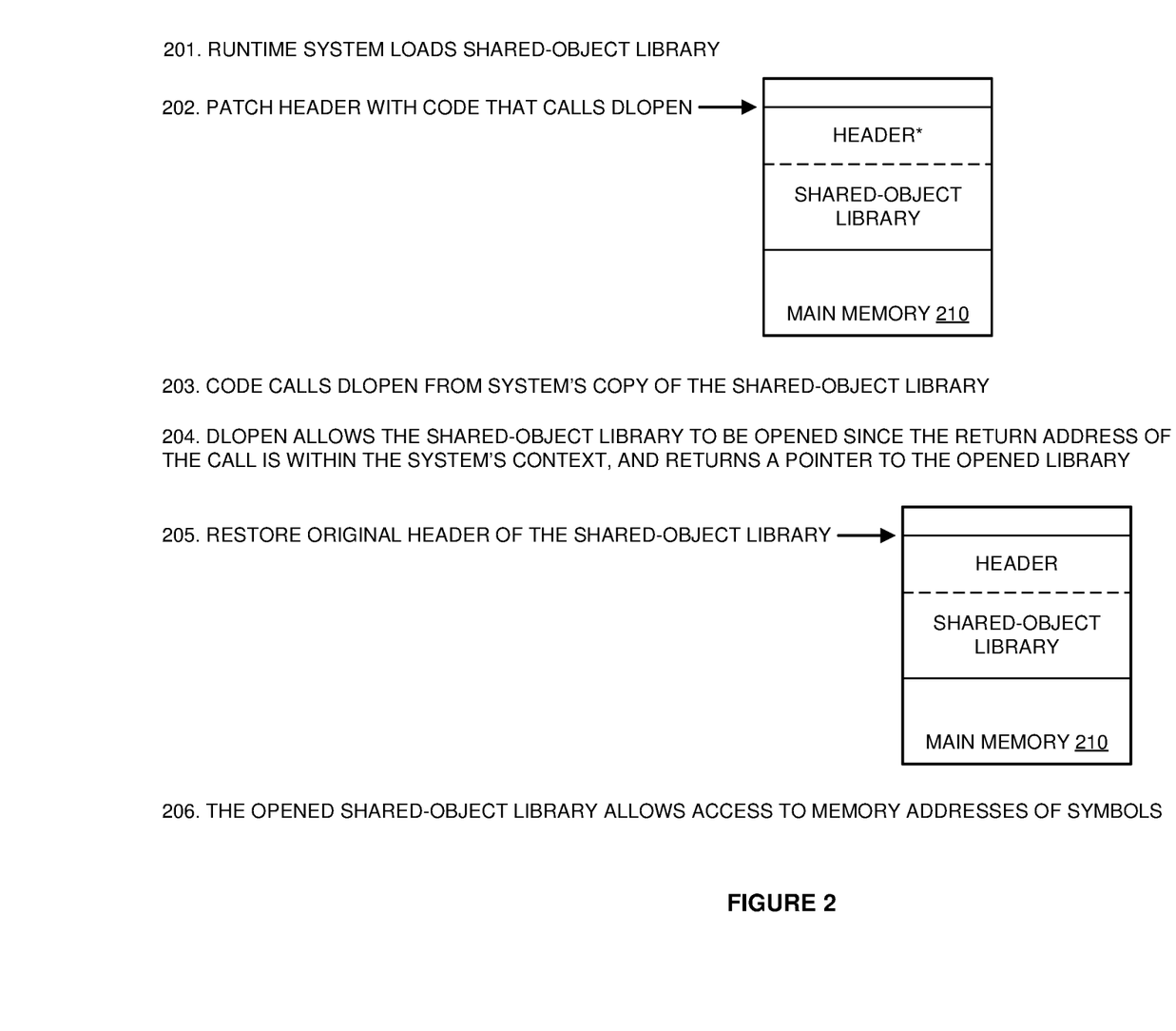
FIG. 2 is a block diagram that illustrates a process flow in an exemplary embodiment.
Figure 3:
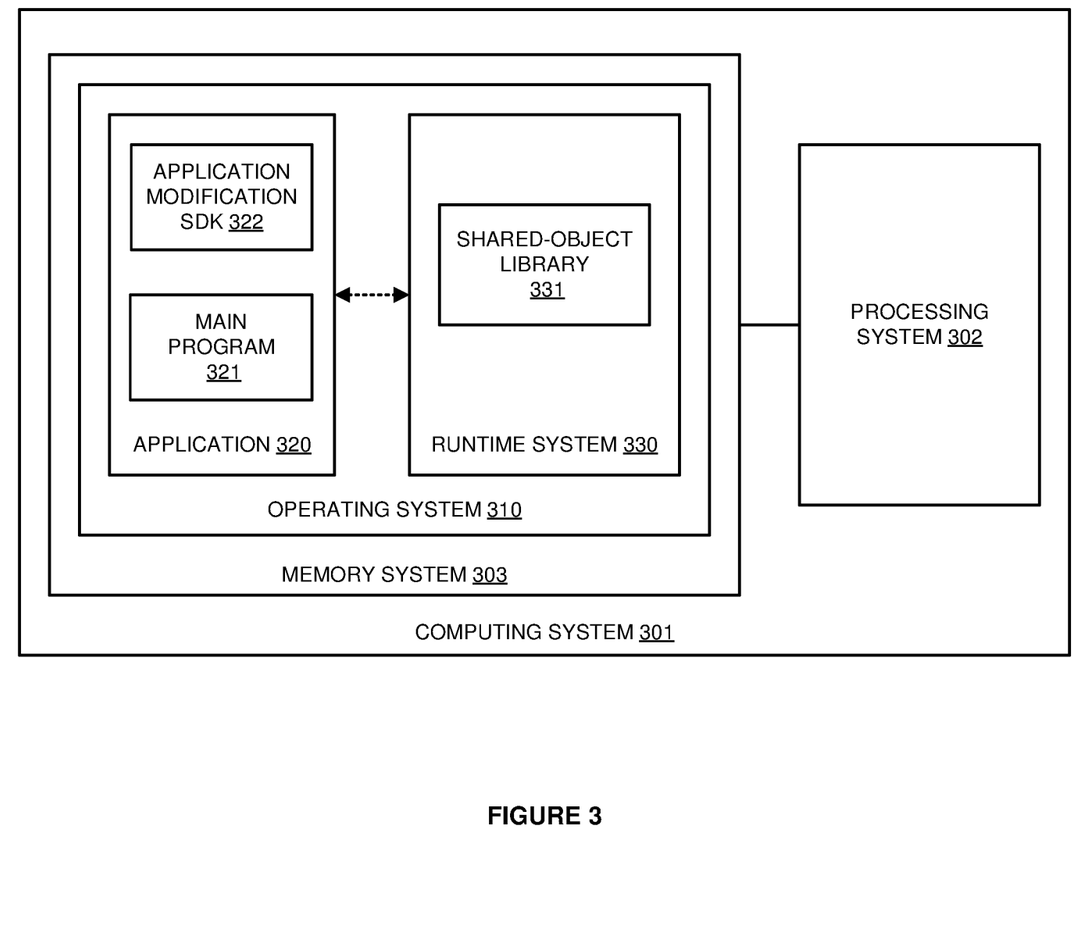
FIG. 3 is a block diagram that illustrates a computing system.
Figure 4:
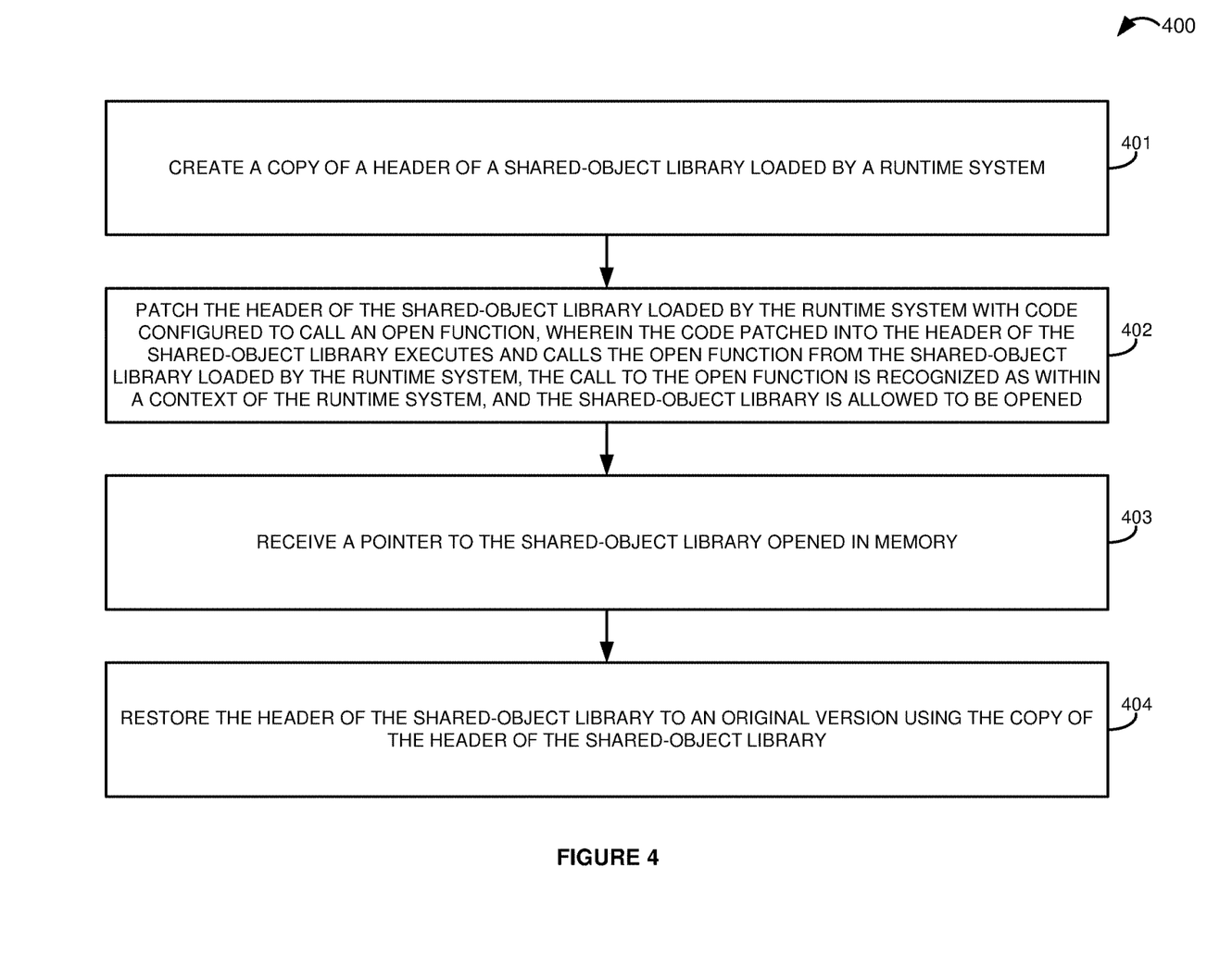
FIG. 4 is a flow diagram that illustrates an operation of a computing system in an exemplary embodiment.
Figure 5:
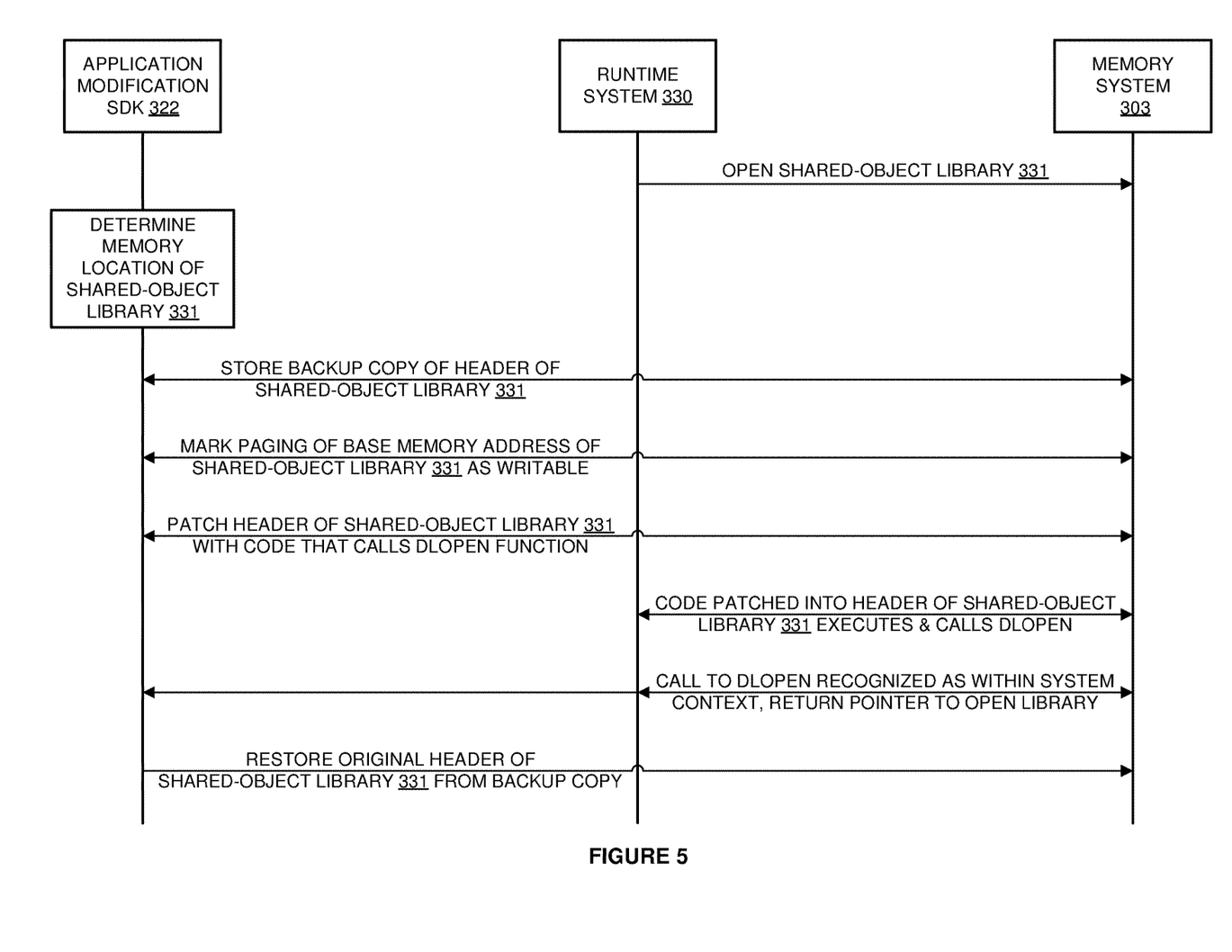
FIG. 5 is a sequence diagram that illustrates an operation of a computing system in an exemplary embodiment.
Figure 6:
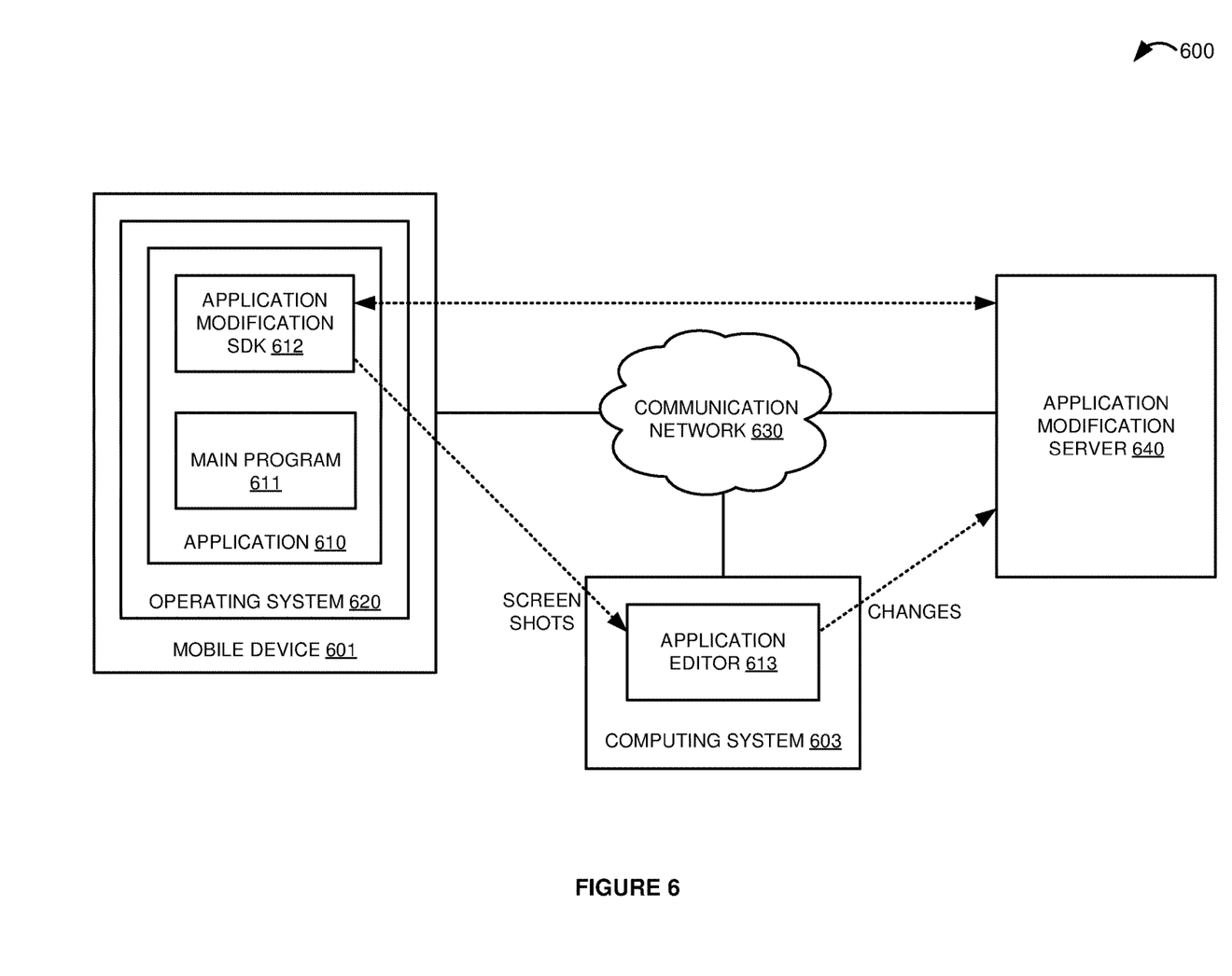
FIG. 6 is a block diagram that illustrates a communication system.
Figure 7:
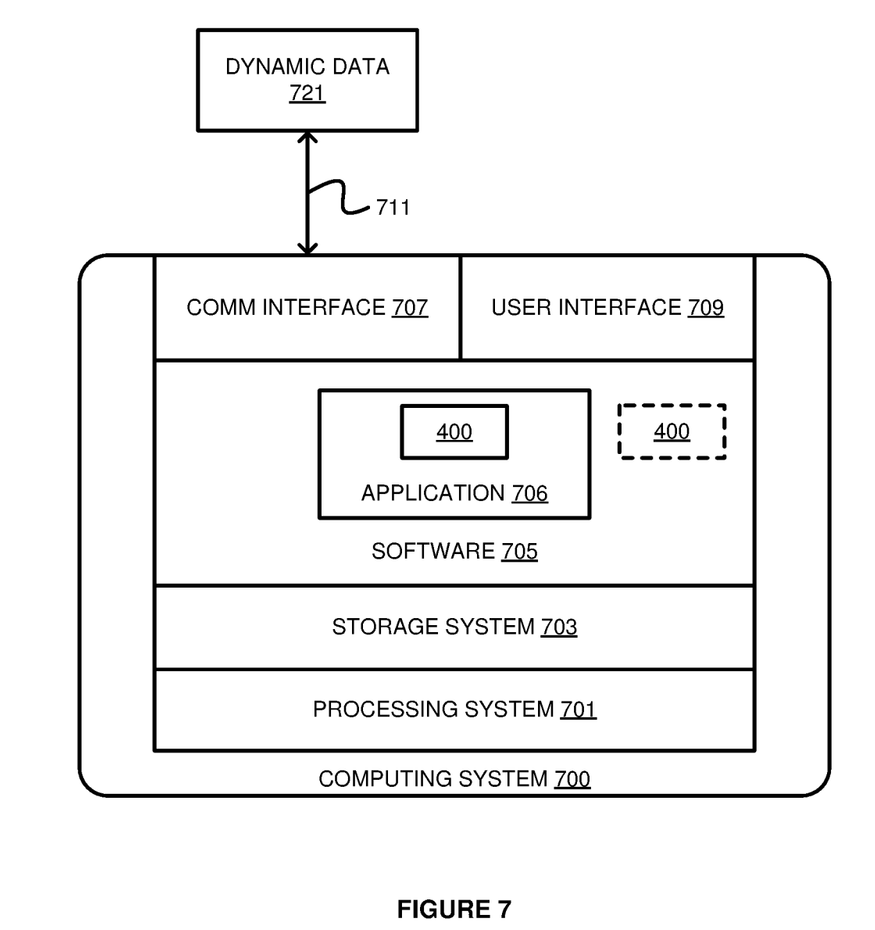
FIG. 7 is a block diagram that illustrates a computing system.

Referring now to the drawings, FIG. 1 illustrates an exemplary process flow of a problem statement related to system context checking that prevents an application from opening a shared-object library, while FIG. 2 illustrates a process flow of a technique to bypass this context check in an exemplary embodiment. FIG. 3 illustrates an exemplary computing system, while FIGS. 4 and 5 illustrate operations of the computing system in exemplary embodiments. FIG. 6 illustrates a communication system that may be utilized to implement customizations of visual elements and other features of an application in an exemplary embodiment, while FIG. 7 illustrates an exemplary computing system that may be used to perform any of the techniques, processes, and operational scenarios described herein.

Turning now to FIG. 1, an exemplary process flow of a problem statement is illustrated. The steps of the process flow are labeled 101 through 104. In this example, when an application calls a function to open a shared-object library, such as the dlopen function, the runtime system is configured to check the caller's context, and only allows for opening libraries that are part of the caller's context. Libraries that were previously loaded outside of the caller's context, such as those loaded by the runtime system, are not accessible from the caller's context and thus would be prevented from opening in response to the application's call to open the library.

In the exemplary process flow of FIG. 1, the runtime system initially loads a shared-object library into the application memory space of main memory 110, as shown in step 101. Subsequently, in step 102 the application code calls dlopen on the shared object library loaded by the runtime system. In this example, a context check has been added to dlopen calls which prevents an application from opening a shared-object library that was already loaded by the runtime system. For example, the context check could examine the caller's return address, and use it to identify the list of libraries that have already been loaded by the calling context. In this case, dlopen would only allow libraries to be opened if they are part of the caller's context, or if they are a new, previously unloaded library. For libraries that have already been loaded by another context, such as those loaded by the runtime system, a new copy of the library is loaded for the caller's context, so there is no access by the caller to the memory addresses of symbols in shared-object libraries that were previously loaded outside of the caller's context. Accordingly, in this example dlopen prevents the open of the system copy of the shared-object library, since the return address of the call from the application code is not within the system's context, and instead loads a new copy of the library, as shown in step 103. The calling application then has no access to the memory addresses of symbols in the system copy of the shared-object library, as explained in step 104, and thus is unable to make any modifications to features of the library that would otherwise complicate or prevent the application from swizzling portions of the application code. One technique of bypassing this system context checking to enable the application to call dlopen on a shared-object library that was loaded by the runtime system will now be described with respect to FIG. 2.

FIG. 2 illustrates an exemplary process flow that enables an application to access a shared-object library opened by the runtime system by bypassing system context checking for dlopen function calls. The steps of the process flow are labeled 201 through 206 in this example. Initially, as described in step 201, the runtime system loads a shared-object library into the application memory space of main memory 210. Subsequently, the application patches the header of the shared-object library with code that calls dlopen, as shown in step 202. Usually, this patching would be performed by an SDK installed into the application, although the application code itself could be configured to perform this step in some implementations. In at least one implementation, in order to determine where in memory the shared-object library is loaded so that the header may be patched, the application could determine the base address of the shared-object library based on its call address. The call address is the location in memory where a block of code is called, and the base address of that code can be determined by looking at what memory address is referenced by the call address. For example, the SDK could keep track of and/or get passed information from the statements chain of the operating system which would indicate where the call address of a shared-object library is in the call stack. The SDK could then step backwards from the call address to determine the base address of the shared-object library, which identifies where the library is loaded into memory, and this base address location will persist during runtime. The base memory address of the shared-object library is then recorded and the paging for this address can be marked as writable. The data bytes stored at that memory address may then be copied to another location in memory to store a backup copy of the original header data prior to patching the header. The header is then patched with code that calls the dlopen function as shown in step two. In at least one implementation, an application running on the Android® platform could determine where in memory the shared-object library libart.so is located by checking the Linux® proc/id/map. Once the location in memory of libart.so is known, the header can be patched with the code that calls the dlopen function.

When the code that was patched into the header of the shared-object library executes, the code calls dlopen from the system's copy of the shared-object library, as described in step 203. In this manner, the call to dlopen is received from the shared-object library loaded by the runtime system, and is therefore recognized as part of the system's context. Accordingly, dlopen allows the shared-object library to be opened since the return address of the call is within the system's context, and returns a pointer to the opened library, as indicated in step 204. After successfully opening the shared-object library, the original header of the shared-object library is restored from the backup copy to allow normal program operation, as shown in step 205. The now-opened shared-object library allows access to the memory addresses of symbols, functions, variables, and other components of the library, as described in step 206. With knowledge of these memory addresses, the once inaccessible member functions and symbols of the shared-object library may now be manipulated in memory to disable or alter various features and functionality provided by the library, such as garbage collection, just-in-time translation, and other native methods of the runtime system that would otherwise complicate or prevent the SDK and/or application from swizzling portions of the application code or executing those swizzled methods.

Turning now to FIG. 3, a block diagram of computing system 301 is illustrated. Computing system 301 comprises processing system 302 and memory system 303. Processing system 302 is operatively coupled with memory system 303. Memory system 303 stores operating system 310, application 320, runtime system 330, and shared-object library 331. Application 320 includes main program code 321 and application modification software development kit (SDK) 322. In at least one implementation, runtime system 330 could comprise an Android® Runtime (ART) environment.

In operation, processing system 302 retrieves program code for operating system 310, application 320, and runtime system 330 from memory system 303, and upon retrieval, processing system 302 loads and executes operating system 310, application 320, and runtime system 330 using available memory space of memory system 303. Upon execution, runtime system 330 loads shared-object library 331. Exemplary operations of computing system 301 to bypass system context checks to facilitate opening shared-object library 331 will now be discussed with respect to FIGS. 4 and 5.

FIG. 4 is a flow diagram that illustrates an operation of computing system 301 in an exemplary implementation. The operation 400 shown in FIG. 4 may also be referred to as bypass process 400 herein. The steps of the operation are indicated below parenthetically. The following discussion of operation 400 will proceed with reference to elements of computing system 301 of FIG. 3 in order to illustrate its operations, but note that the details provided in FIG. 3 are merely exemplary and not intended to limit the scope of process 400 to the specific implementation of FIG. 3.

Operation 400 may be employed by computing system 301 to bypass system context checks to facilitate opening shared-object library 331. Initially, as discussed above, runtime system 330 loads shared-object library 331 into the application memory space of memory system 303. Subsequently, as shown in the operational flow of FIG. 4, application 320 directs computing system 301 to create a copy of a header of shared-object library 331 loaded by runtime system 330 (401). In at least one implementation, a control module embedded into application 320, such as application modification SDK 322, may be configured to create the copy of the header of shared-object library 331 loaded by runtime system 330. In order to create the copy of the header, in some implementations computing system 301 may determine where shared-object library 331 is located in memory. In at least one implementation, application 320 and/or SDK 322 could determine where in memory shared-object library 331 is located by checking a process identification map, such as the proc/id/map in Linux® operating systems. In some examples, in order to determine where shared-object library 331 is located in memory, application 320 may direct computing system 301 to determine a base memory address of shared-object library 331 based on a call address of shared-object library 331. The call address is the location in memory where a block of code is called, and the base address of that code can be determined by looking at what memory address is referenced by the call address. For example, application 320 and/or SDK 322 may receive information from the statements chain of operating system 310 that indicates where the call address of shared-object library 331 is located in the call stack. The base address of shared-object library 331 could then be determined by stepping backwards from the call address. The base address of shared-object library 331 identifies where library 331 is loaded into memory, which will persist during runtime. The base memory address of shared-object library 331 may then be recorded, and the paging of the base memory address of shared-object library 331 can be marked as writable. The data bytes stored at the base memory address of shared-object library 331 can be copied to another location in memory system 303 to store a backup copy of the original header data.

Application 320 directs computing system 301 to patch the header of shared-object library 331 loaded by runtime system 330 with code configured to call an open function (402). In at least one implementation, a control module embedded into application 320, such as application modification SDK 322, may be configured to patch the header of shared-object library 331 loaded by runtime system 330 with the code configured to call the open function. For example, the header of shared-object library 331 may be patched by editing the header in memory and inserting the program code into the header that is configured to call the open function. In at least one implementation, the open function comprises a dlopen function. Upon execution, the code patched into the header of shared-object library 331 calls the open function from shared-object library 331 loaded by runtime system 330, the call to the open function is recognized as within a context of runtime system 330, and shared-object library 331 is allowed to be opened (402). Advantageously, since the call to the open function is received from shared-object library 331 loaded by runtime system 330, the call is recognized as part of the system's context. In some implementations, the call to the open function may be recognized as within the context of runtime system 330 based on a return address of the call to the open function being within the context of runtime system 330, and therefore shared-object library 331 is responsively allowed to be opened. In at least one implementation, the open function may return a pointer to the opened library.

Application 320 directs computing system 301 to receive a pointer to shared-object library 331 opened in memory (403). For example, the pointer may indicate a memory address of where shared-object library 331 is loaded in memory system 303. In at least one implementation, a control module embedded into application 320, such as application modification SDK 322, may be configured to receive the pointer to shared-object library 331 opened in memory. In some examples, when the open function allows shared-object library 331 to be opened, the open function may return a pointer to the opened library, as discussed above. Accordingly, the pointer to shared-object library 331 opened in memory may be received when the pointer is returned from the call to the open function from shared-object library 331 loaded by runtime system 330.

Application 320 directs computing system 301 to restore the header of shared-object library 331 to an original version using the copy of the header of shared-object library 331

(404). For example, after successfully opening shared-object library 331, the original header of shared-object library 331 may be restored from the backup copy to allow normal program operation. In at least one implementation, a control module embedded into application 320, such as application modification SDK 322, may be configured to restore the header of shared-object library 331 to an original version using the copy of the header of shared-object library 331. In some examples, the header of shared-object library 331 may be restored to the original version by referencing the base address of shared-object library 331 that identifies where library 331 is loaded into memory, and editing the header in memory to restore the header of shared-object library 331 to the original version using the backup copy of the header.

Advantageously, once shared-object library 331 is opened and its location in memory is known from the pointer, application 320 can then access the memory addresses of symbols, functions, variables, and other components of shared-object library 331. With knowledge of these memory addresses, the once inaccessible member functions and symbols of shared-object library 331 may now be manipulated in memory to disable or alter various features and functionality provided by the library, such as garbage collection, just-in-time translation, and other native methods of runtime system 330 that would otherwise complicate or prevent application 320 and/or SDK 322 from manipulating the behavior of the program code of main program 321 through swizzling or other techniques. Another exemplary operation of computing system 301 to facilitate bypassing system context checks to enable opening shared-object libraries will now be discussed with respect to FIG. 5.

FIG. 5 is a sequence diagram that illustrates an operation of computing system 301 in an exemplary implementation. Initially, runtime system 330 opens shared-object library 331 in the memory space of memory system 303. Subsequently, application modification SDK 322 determines the memory location of shared-object library 331. In some examples, SDK 322 may determine where shared-object library 331 is located in memory by checking a process identification map, such as the proc/id/map in Linux® operating systems, or by looking at what memory address is referenced by the call address of shared-object library 331 to determine its base address. Once the base address of shared-object library 331 is determined, SDK 322 may then record the base address of shared-object library 331, and the data bytes stored at the base memory address of shared-object library 331 can be copied to another location in memory system 303 to store a backup copy of the original header data of shared-object library 331.

In order to enable patching of the header information, application modification SDK 322 marks the paging of the base address of shared-object library 331 as writable. SDK 322 then patches the header of shared-object library 331 with code that calls the dlopen function. Subsequently, the code patched into the header of shared-object library 331 executes and calls the dlopen function from within the context of shared-object library 331 loaded by runtime system 330. Accordingly, since the call to the dlopen function is received from shared-object library 331 loaded by runtime system 330 and thus is recognized as within the context of runtime system 330, the shared-object library 331 is allowed to be opened. Upon opening the shared-object library 331, the dlopen function returns a pointer to the opened library.

SDK 322 receives the pointer to shared-object library 331 returned by the dlopen function that was called by way of the patched header of shared-object library 331. Accordingly, SDK 322 is informed of the memory location of the opened shared-object library 331 as indicated in the pointer. Application modification SDK 322 then restores the header of shared-object library 331 to the original version using the backup copy of the header of shared-object library 331 to allow for normal program operation.

With knowledge of the memory address of shared-object library 331 as returned in the pointer by the dlopen function, SDK 322 may now beneficially access the memory addresses of symbols, functions, variables, and other components of shared-object library 331. Accordingly, the member functions and symbols of shared-object library 331 may then be manipulated in memory by SDK 322 in order to disable or alter various features and functionality provided by the library, which thereby enables SDK 322 to modify visual elements of application 320 in real-time using swizzled methods.

Turning now to FIG. 6, a block diagram of communication system 600 is illustrated. Communication system 600 includes mobile device 601, computing system 603, communication network 630, and application modification server 640. Mobile device 601 includes operating system 620 and application 610. Application 610 runs on operating system 620. Mobile device 601 may also include a user interface that communicates with operating system 620 over a bus communication device. Application 610 comprises main program 611 and application modification software development kit (SDK) 612, which may be implemented as different software modules of application 610. Main program 611 comprises the primary program instructions for the functionality of the application, such as streaming video, social networking, email, instant messaging, weather, navigation, or any other mobile application. Application modification SDK 612 may be installed into application 610 to facilitate changes and updates to a user interface and other visual elements of the application 610, perform A/B testing of different application design variants, and other functionality. In some examples, application modification SDK 612 could comprise an embedded control module of application 610. Computing system 603 includes application editor 613. Computing system 603 may also include an operating system and user interface, although these components are not shown for clarity. Application modification server 640 comprises a computing system that provides an application development and optimization platform. In some examples, application editor 613 may comprise a web browser application that loads the application development and optimization platform provided by application modification server 640.

In operation, a developer of application 610 may execute application editor 613 on computing system 603 to operate an application management dashboard to apply real-time changes and updates to a user interface and other visual elements of the application 610, activate or deactivate features, perform A/B testing of different application design variants to determine how changes to application 610 affect user behavior, customize the application 610, modify web content displayed within a webview, and other functionality. The developer may execute application 610 on mobile device 601 for use as a test device, and the execution of application 610 would then be mirrored in the visual editor 613 executing on computing system 603. The mirrored execution of application 610 within application editor 613 is achieved by application modification SDK 612 transferring screenshots of the application 610 to computing system 603 for display within the editor 613, which may communicate over web sockets. SDK 612 sends information about the user interface of application 610 to computing system 603 for display within application editor 613, including the entire view hierarchy of application 610, which comprises descriptions or labels of all views that exist in the current interface and screenshots of the views. In this manner, the screenshots of the views can be displayed as images on the screen within the visual application editor 613, and the view descriptions, labels, and any other information may be displayed in a tree structure or tree diagram that represents the view hierarchy structure in a graphical form.

Once the visual application editor 613 receives and displays the view hierarchy of application 610, the developer can then click through the various views within the view hierarchy and make changes to different visual elements of the user interface. These changes are then sent to the application modification server 640 which can instantly update the display of application 610 with the changes in real-time on mobile device 601 via communication with application modification SDK 612. Similarly, other application management functionality of the visual application editor 613 may be created and communicated to application modification server 640 and subsequently deployed to application 610 on mobile device 601 by communicating with SDK 612. Of course, any of the functionality described herein could be applied to numerous instances of application 610 installed on multitudes of user mobile devices which may affect some or all of the entire user base, but only one mobile device 601 is shown in FIG. 6 for clarity. In some operating environments, the techniques described herein related to bypassing context checking for calls to open a shared-object library may be necessary in order for SDK 612 to perform some or all of the functionality described above, including the ability to update the display of application 610 with the changes in real-time on mobile device 601 using swizzled methods. For example, without employing the context-checking bypass techniques disclosed herein, SDK 612 may not have access to the memory addresses of symbols in shared-object libraries loaded by the runtime system, and thus would be unable to make any modifications to features of the library that would otherwise complicate or prevent the application from swizzling portions of the application code.

Still referring to FIG. 6, mobile device 601 comprises a processing system and communication transceiver. Mobile device 601 may also include other components such as a user interface, data storage system, and power supply. Mobile device 601 may reside in a single device or may be distributed across multiple devices. Examples of mobile device 601 include mobile computing devices, such as cell phones, tablet computers, laptop computers, notebook computers, and gaming devices, as well as any other type of mobile computing devices and any combination or variation thereof. Examples of mobile device 601 may also include desktop computers, server computers, and virtual machines, as well as any other type of computing system, variation, or combination thereof.

Computing system 603 comprises a processing system and communication transceiver. Computing system 603 may also include other components such as a user interface, data storage system, and power supply. Computing system 603 may reside in a single device or may be distributed across multiple devices. Examples of computing system 603 include mobile computing devices, such as cell phones, tablet computers, laptop computers, notebook computers, and gaming devices, as well as any other type of mobile computing devices and any combination or variation thereof. Examples of computing system 603 also include desktop computers, server computers, and virtual machines, as well as any other type of computing system, variation, or combination thereof.

Communication network 630 could comprise multiple network elements such as routers, gateways, telecommunication switches, servers, processing systems, or other communication equipment and systems for providing communication and data services. In some examples, communication network 630 could comprise wireless communication nodes, telephony switches, Internet routers, network gateways, computer systems, communication links, or some other type of communication equipment, including combinations thereof. Communication network 630 may also comprise optical networks, packet networks, local area networks (LAN), metropolitan area networks (MAN), wide area networks (WAN), or other network topologies, equipment, or systems—including combinations thereof. Communication network 630 may be configured to communicate over metallic, wireless, or optical links. Communication network 630 may be configured to use time-division multiplexing (TDM), Internet Protocol (IP), Ethernet, optical networking, wireless protocols, communication signaling, or some other communication format, including combinations thereof. In some examples, communication network 630 includes further access nodes and associated equipment for providing communication services to several computer systems across a large geographic region.

Application modification server 640 may be representative of any computing apparatus, system, or systems that may connect to another computing system over a communication network. Application modification server 640 comprises a processing system and communication transceiver. Application modification server 640 may also include other components such as a router, server, data storage system, and power supply. Application modification server 640 may reside in a single device or may be distributed across multiple devices. Application modification server 640 may be a discrete system or may be integrated within other systems, including other systems within communication system 600. Some examples of application modification server 640 include desktop computers, server computers, cloud computing platforms, and virtual machines, as well as any other type of computing system, variation, or combination thereof.

Referring now to FIG. 7, a block diagram that illustrates computing system 700 in an exemplary implementation is shown. Computing system 700 provides an example of computing system 301, mobile device 601, computing system 603, application modification server 640, or any computing system that may be used to execute bypass process 400 or variations thereof, although such systems could use alternative configurations. Computing system 700 includes processing system 701, storage system 703, software 705, communication interface 707, and user interface 709. Software 705 includes application 706 which itself includes bypass process 400. Bypass process 400 may optionally be implemented separately from application 706 as indicated by the dashed lines surrounding process 400 in FIG. 7.

Computing system 700 may be representative of any computing apparatus, system, or systems on which application 706 and bypass process 400 or variations thereof may be suitably implemented. Computing system 700 may reside in a single device or may be distributed across multiple devices. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for each implementation or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer-readable storage media capable of storing software 705 and readable by processing system 701. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 709, processing system 701 loads and executes portions of software 705, such as bypass process 400, to bypass system context checks to facilitate opening shared-object libraries as described herein. Software 705 may be implemented in program instructions and among other functions may, when executed by computing system 700 in general or processing system 701 in particular, direct computing system 700 or processing system 701 to create a copy of a header of a shared-object library loaded by a runtime system. Software 705 may further direct computing system 700 or processing system 701 to patch the header of the shared-object library loaded by the runtime system with code configured to call an open function, wherein the code patched into the header of the shared-object library executes and calls the open function from the shared-object library loaded by the runtime system, the call to the open function is recognized as within a context of the runtime system, and the shared-object library is allowed to be opened. Software 705 may also direct computing system 700 or processing system 701 to receive a pointer to the shared-object library opened in memory. Further, software 705 may direct computing system 700 or processing system 701 to restore the header of the shared-object library to an original version using the copy of the header of the shared-object library.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized to bypass system context checks to facilitate opening shared-object libraries as described herein for each implementation or variations thereof. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-readable storage media are characterized as primary or secondary storage.

In some examples, if the computer-readable storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement application 706 and/or bypass process 400 to operate as described herein for each implementation (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 709. In some examples, user interface 709 could include a touch screen capable of displaying a graphical user interface that also accepts user inputs via touches on its surface. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface. User interface 709 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to bypass system context checks to facilitate opening shared-object libraries, the method comprising:
   creating a copy of a header of a shared-object library loaded by a runtime system;
   patching the header of the shared-object library loaded by the runtime system with code configured to call an open function, wherein the code patched into the header of the shared-object library executes and calls the open function from the shared-object library loaded by the runtime system, the call to the open function is recognized as within a context of the runtime system, and the shared-object library is allowed to be opened;
   receiving a pointer to the shared-object library opened in memory; and
   restoring the header of the shared-object library to an original version using the copy of the header of the shared-object library.

2. The method of claim 1 further comprising determining where the shared-object library is located in the memory.

3. The method of claim 2 wherein determining where the shared-object library is located in the memory comprises determining a base memory address of the shared-object library based on a call address of the shared-object library.

4. The method of claim 3 further comprising marking a paging of the base memory address of the shared-object library as writable.

5. The method of claim 1 wherein the open function comprises a dlopen function.

6. The method of claim 1 wherein the call to the open function is recognized as within the context of the runtime system and the shared-object library is allowed to be opened based on a return address of the call to the open function being within the context of the runtime system.

7. The method of claim 1 wherein receiving the pointer to the shared-object library opened in memory comprises receiving the pointer to the shared-object library opened in memory returned from the call to the open function from the shared-object library loaded by the runtime system.

8. One or more computer-readable storage media having program instructions stored thereon to bypass system context checks to facilitate opening shared-object libraries, wherein the program instructions, when executed by a computing system, direct the computing system to at least:
   create a copy of a header of a shared-object library loaded by a runtime system;
   patch the header of the shared-object library loaded by the runtime system with code configured to call an open function, wherein the code patched into the header of the shared-object library executes and calls the open function from the shared-object library loaded by the runtime system, the call to the open function is recognized as within a context of the runtime system, and the shared-object library is allowed to be opened;
   receive a pointer to the shared-object library opened in memory; and
   restore the header of the shared-object library to an original version using the copy of the header of the shared-object library.

9. The one or more computer-readable storage media of claim 8 wherein the program instructions further direct the computing system to determine where the shared-object library is located in the memory.

10. The one or more computer-readable storage media of claim 9 wherein the program instructions direct the computing system to determine where the shared-object library is located in the memory by directing the computing system to determine a base memory address of the shared-object library based on a call address of the shared-object library.

11. The one or more computer-readable storage media of claim 10 wherein the program instructions further direct the computing system to mark a paging of the base memory address of the shared-object library as writable.

12. The one or more computer-readable storage media of claim 8 wherein the open function comprises a dlopen function.

13. The one or more computer-readable storage media of claim 8 wherein the call to the open function is recognized as within the context of the runtime system and the shared-object library is allowed to be opened based on a return address of the call to the open function being within the context of the runtime system.

14. The one or more computer-readable storage media of claim 8 wherein the pointer to the shared-object library opened in memory is returned from the call to the open function from the shared-object library loaded by the runtime system.

15. A computing apparatus comprising:
one or more computer-readable storage media;
a processing system operatively coupled with the one or more computer-readable storage media; and
a mobile application stored on the one or more computer-readable storage media and including an embedded control module comprising program instructions that, when executed by the processing system, direct the processing system to at least:
create a copy of a header of a shared-object library loaded by a runtime system;
patch the header of the shared-object library loaded by the runtime system with code configured to call an open function, wherein the code patched into the header of the shared-object library executes and calls the open function from the shared-object library loaded by the runtime system, the call to the open function is recognized as within a context of the runtime system, and the shared-object library is allowed to be opened;

receive a pointer to the shared-object library opened in memory; and
restore the header of the shared-object library to an original version using the copy of the header of the shared-object library.

16. The computing apparatus of claim 15 wherein the program instructions further direct the processing system to determine where the shared-object library is located in the memory.

17. The computing apparatus of claim 16 wherein the program instructions direct the processing system to determine where the shared-object library is located in the memory by directing the processing system to determine a base memory address of the shared-object library based on a call address of the shared-object library.

18. The computing apparatus of claim 17 wherein the program instructions further direct the processing system to mark a paging of the base memory address of the shared-object library as writable.

19. The computing apparatus of claim 15 wherein the open function comprises a dlopen function.

20. The computing apparatus of claim 15 wherein the call to the open function is recognized as within the context of the runtime system and the shared-object library is allowed to be opened based on a return address of the call to the open function being within the context of the runtime system.

* * * * *